(12) United States Patent
Barnstedt

(10) Patent No.: US 10,233,036 B2
(45) Date of Patent: Mar. 19, 2019

(54) METHOD FOR SEPARATING PLANAR AND THREE-DIMENSIONAL SOLIDS IN A FLOW OF BULK GOODS

(76) Inventor: Dirk Barnstedt, Rötha (DE)

( * ) Notice: Subject to any disclaimer, the term of this patent is extended or adjusted under 35 U.S.C. 154(b) by 0 days.

(21) Appl. No.: 13/822,464

(22) PCT Filed: Oct. 24, 2010

(86) PCT No.: PCT/DE2010/001238
§ 371 (c)(1),
(2), (4) Date: Mar. 12, 2013

(87) PCT Pub. No.: WO2012/034547
PCT Pub. Date: Mar. 22, 2012

(65) Prior Publication Data
US 2013/0180825 A1    Jul. 18, 2013

(30) Foreign Application Priority Data
Sep. 14, 2010   (DE) .................. 10 2010 045 309

(51) Int. Cl.
 B07B 4/06    (2006.01)
 B65G 47/72   (2006.01)
 B07B 13/00   (2006.01)
 B07B 13/08   (2006.01)

(52) U.S. Cl.
CPC ............. *B65G 47/72* (2013.01); *B07B 4/06* (2013.01); *B07B 13/003* (2013.01); *B07B 13/08* (2013.01)

(58) Field of Classification Search
CPC .......... B07B 1/14; B07B 4/08; B07B 13/003; B07B 4/06; B65G 47/72

USPC ....... 209/643, 673, 689, 667; 271/91, 93, 96
See application file for complete search history.

(56) References Cited

U.S. PATENT DOCUMENTS

| | | | | |
|---|---|---|---|---|
| 1,328,733 A | * | 1/1920 | Harriss ...................... | 131/327 |
| 3,587,851 A | * | 6/1971 | Anderson .................. | 209/643 |
| 3,618,935 A | * | 11/1971 | Howatt ................. | B31B 21/00 198/377.04 |
| 4,102,502 A | * | 7/1978 | Vaplon ................... | B07B 1/14 209/2 |
| 4,824,559 A | * | 4/1989 | Gilmore et al. .............. | 209/23 |
| 5,060,806 A | * | 10/1991 | Savage ................... | B07B 1/15 209/668 |
| 6,076,684 A | * | 6/2000 | Bollegraaf ............ | B07B 1/4636 209/668 |
| 6,427,845 B1 | * | 8/2002 | Buer ........................... | 209/643 |

(Continued)

FOREIGN PATENT DOCUMENTS

| DE | 94 17 627 U1 | 12/1994 |
|---|---|---|
| DE | 195 46 830 A1 | 6/1997 |

(Continued)

*Primary Examiner* — Joseph C Rodriguez
(74) *Attorney, Agent, or Firm* — Horst M. Kasper, Esq.

(57) ABSTRACT

The invention relates to a method comprising a device (1) having at least two separating surfaces (2, 2') for separating planar and three-dimensional solids, which can be light, medium, and heavy, wherein the device can be installed and integrated into existing system for separating different material streams, such as garbage and waste. The bulk goods (3) to be separated and fed first to a first separating surface (2), and then to a second separating surface (2') in succession, whereby a high degree of separation between light and heavy bulk goods (3) is achieved.

17 Claims, 11 Drawing Sheets

(56) References Cited

U.S. PATENT DOCUMENTS

Figure 1:
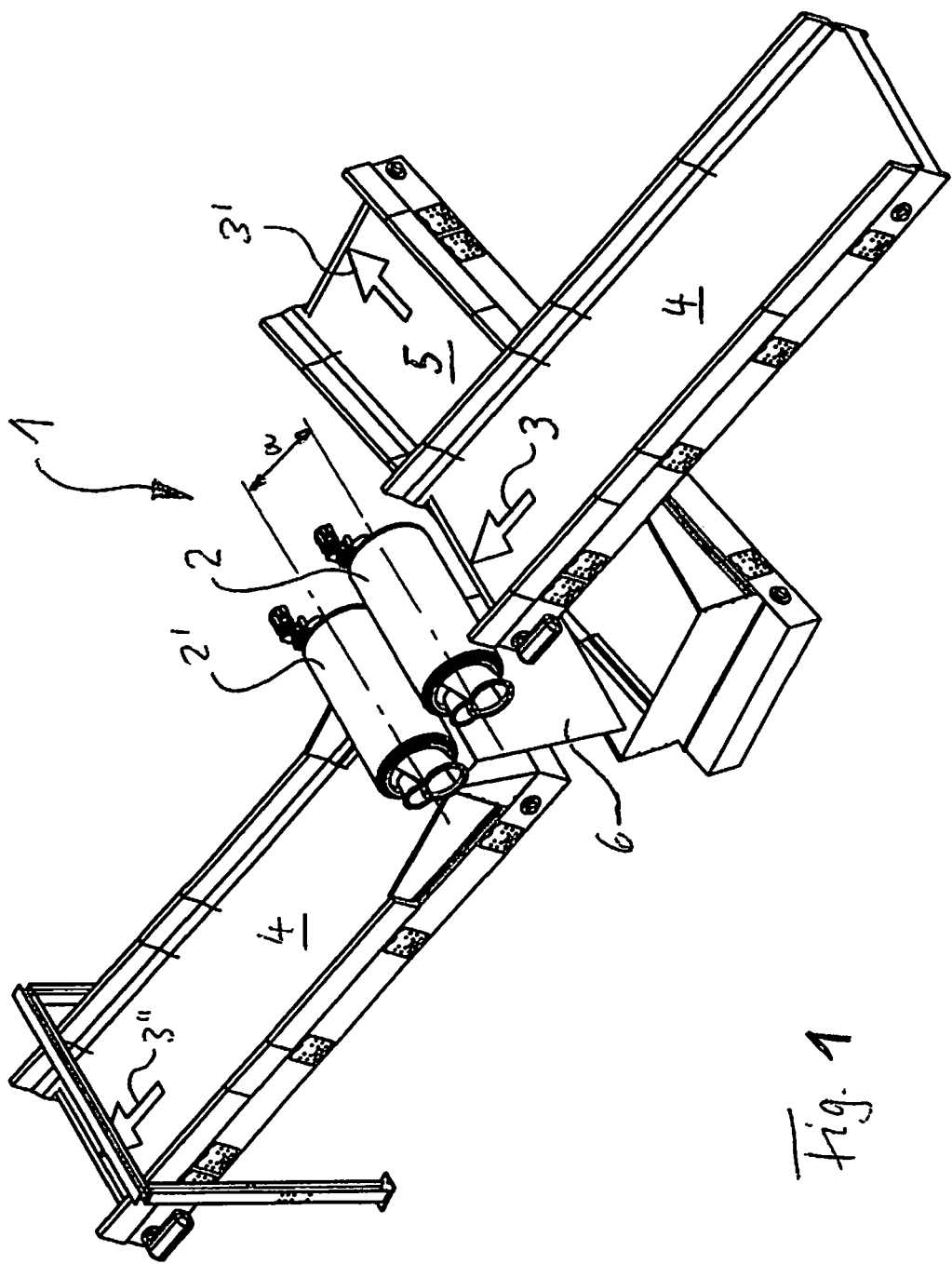

| | | | | |
|---|---|---|---|---|
| 6,494,452 B1 * | 12/2002 | Karasiewicz | ................. | 271/276 |
| 6,648,145 B2 * | 11/2003 | Davis | ........................ | B07B 4/08 |
| | | | | 209/672 |
| 7,434,695 B2 * | 10/2008 | Visscher | ................... | B07B 1/14 |
| | | | | 209/271 |
| 8,191,714 B2 * | 6/2012 | Kalverkamp | .......... | A01D 17/06 |
| | | | | 171/133 |
| 8,373,081 B2 * | 2/2013 | Ackley | ................. | B07C 5/3422 |
| | | | | 209/580 |
| 8,430,249 B2 * | 4/2013 | Visscher et al. | ............... | 209/643 |
| 8,857,621 B2 * | 10/2014 | Campbell | ................ | B07B 1/14 |
| | | | | 209/44.2 |
| 2009/0000993 A1 * | 1/2009 | Visscher | ................... | B07B 1/14 |
| | | | | 209/44.2 |
| 2010/0059420 A1 * | 3/2010 | Mills | ............................ | 209/643 |
| 2011/0247968 A1 * | 10/2011 | Mills | .................... | B07B 13/003 |
| | | | | 209/12.1 |

FOREIGN PATENT DOCUMENTS

| | | |
|---|---|---|
| DE | 102 05 064 A1 | 8/2003 |
| DE | 20 2009 011 601 U1 | 12/2009 |
| EP | 0546 442 A2 | 6/1993 |
| WO | 2008/059209 A1 | 5/2008 |

\* cited by examiner

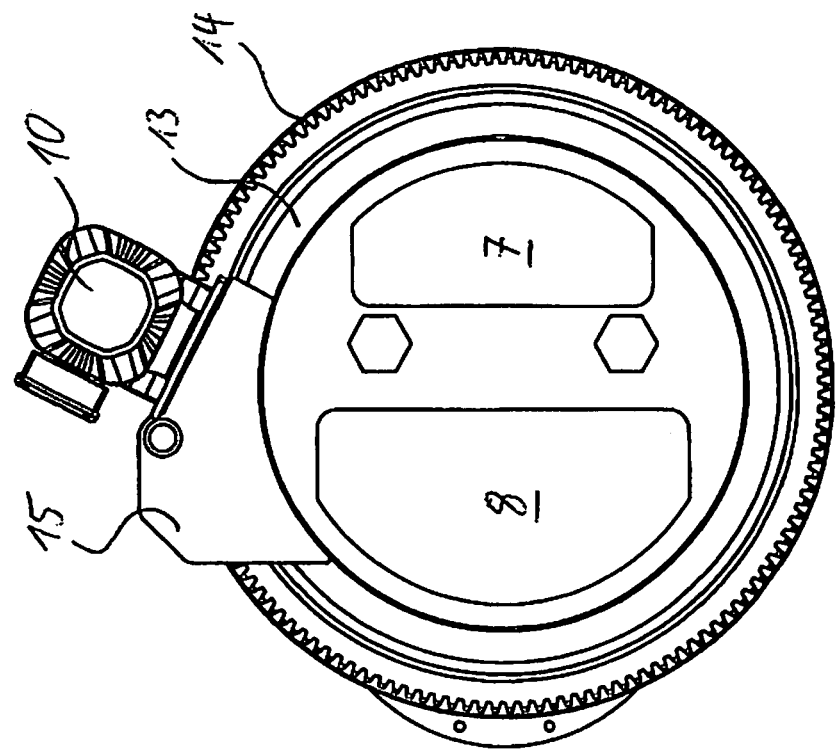
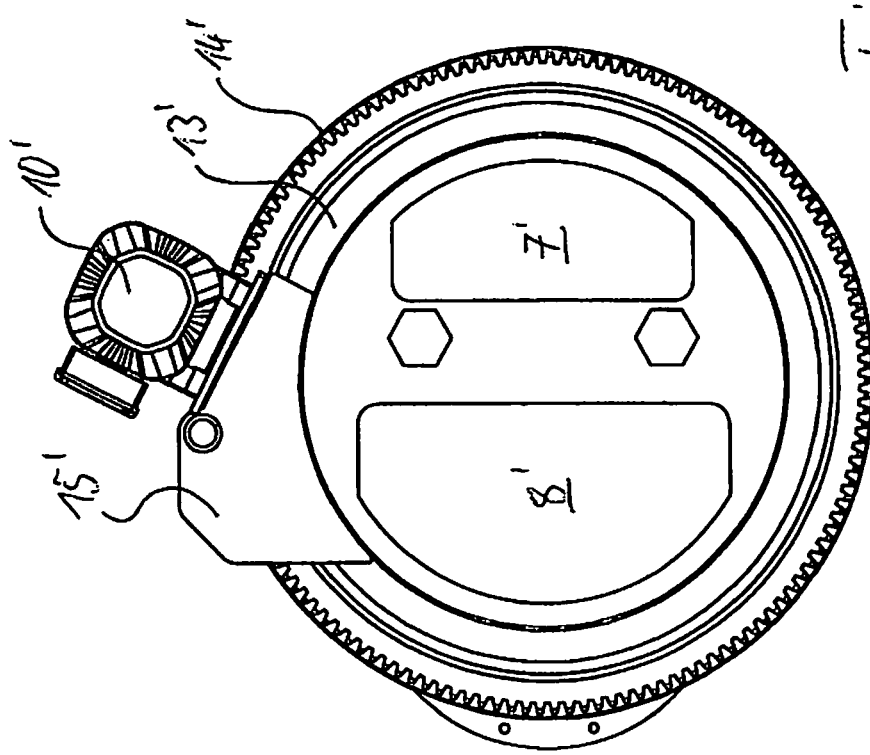
Fig. 5

Perspective view

Sectional view

Left side view

METHOD FOR SEPARATING PLANAR AND THREE-DIMENSIONAL SOLIDS IN A FLOW OF BULK GOODS

The invention deals with a Method for separating planar three-dimensional solids in a flow of bulk goods and body in a bulk material flow with light, middle and heavy solids, in particular with a process that leads to the high grade separation of bulk material in planar and body form solids.

Such a device is in the state of the art from the DE 20 2009 011 601 U1 known. In this publication, a device for cutting flat and body-like solids or light and heavy solids with a rotatable drum, whose coat surface has breakthroughs, is revealed. The special feature of this device is to see that the inner volume of the drum in two areas (D, E) with comparably high volumes is divided, with a volume range (D) negative pressure (pi <pa) and the other volume range (E) pressure or atmospheric pressure (pi ≥ pa) has, with pi of the pressure within the areas D and E, and pa is the atmospheric pressure.

Another similar invention is known from the G 93 06 556.6, their inner volume 4 sectors is divided up, in a sector vacuum and an opposite sector pressure prevails, the left to detach parts are blown off.

The publication of DE 37 26 808 A1 refers to a method with a sieve drum, which runs a pipe, so that the total inner volume of the drum in a vacuum is created, as a result the flat parts on the surface of the screen drum stuck. These parts are then stripped at the bottom of the screen drum by two stripping fixtures from the surface of the screen drum. The stripping off of the individual parts is supported by a further cover, inside the drum tight to the drum wall is arranged and end-side is equipped with both a lip so that the pressure on the inside of the screen drum on the surface of the cover not can affect, to reducing the adhesion of the individual parts. As detrimental to this procedure and the appropriate device, it is felt, that as a result of the relatively weak seal of the end seals the adhesion on the surface of the screen drum is not completely lifted, and it therefore must lead to determinations of flat parts between filter drum and wiper device finally strongly negatively affected the serviceability of the entire system.

It is also from the DE 92 04 985.0 provided a device to sort of reusable materials of plastic and composite waste in the dual system of waste disposal. The device contains a sort drum which has openings on the surface and surfaces is axial slightly tilted. The screening drum is also and is flanked by outside making the sorting goods located in the drum partly on the inner wall of the drum to sticking is and as long as on the inner wall of the drum is liable until the sorting goods at a vertex has arrived and then falling into the sorting drum on a longitudinal conveyor, which causes a separation between flat and body form-waste parts of air suction nozzles. The subject matter falling on the support surface of the conveyor belt be sorted out then again varies blowing nozzles in different parts of the waste from the incoming flow.

A further construction for the separation of materials of different sizes has become known from the DE 43 35 401 C2. This separator has a rotating drum, the drum walls are equipped, which due to their size materials can pass through, which then identify the different materials through controls with sensors and which cause the air nozzle or plunger specifically to the removal of the materials on the outside of the drum with apertures. You made equipment known to the State of the art and procedures are generally relatively costly both in production and operation and have problems with the required degree of separation. Still, sorting machines in the recycling industry to separate are known of recyclable raw materials from materials which are incorporated into the material cycle. Known devices to separate the above solids in mineral processing plants are so-called NIR devices, sifter, helical sorters, ballistic separators and manual sorting.

All previously known and established systems and methods adheres more or less the lack that the degree of separation of the bulk material is not entirely the requirements of incinerators and value material recyclers because often large solids are hard-separable. Also there are known in the purchase of expensive and have problems with the necessary degree of separation of the mass flow, as well as with the operational safety. Also, in most cases, it is not possible to make modifications that are seamlessly put into the existing system. Thus it is one object of the present invention, to provide a procedure with a device that is able to sort the mass flow of loose material from various components into its constituent parts in a simple way and to incorporate the device into an existing system, that the separation degree meets the requirements of the waste management. This problem is solved with the characterizing features of the main claims.

The Invention according to the device for cutting flat and body shape of solids and/or light and heavy solids, is characterized by the fact that at least two parting surfaces in a pre-defined distance (a, b) are arranged to each other, so that the body shaped components of bulk material time consecutively touch the parting surfaces.

A basic idea of the present invention is to see that at least two parting surfaces at a predetermined distance (a, b) are arranged horizontally and vertically to each other that time in a row, the material to be separated is fed to the procedure for cutting planar and body form a bulk material is solids. It is advantageous that the two surfaces are formed in a drum-shaped. It is also advantageous that the volume of the drum in at least two areas (D, E) is divided, with a volume range (D) negative pressure (pi <pa) and the other volume range (E) pressure or atmospheric pressure (pi ≥pa) has, with pi of the pressure within the areas D and E, and pa is the atmospheric pressure.

A further idea is a device for separating flat and body-like solids or light and heavy solids with a rotatable drum, whose coat surfaces exhibit openings and is characterized by the fact that in the interior of the drum volume negative pressure (pi <pa) prevails, which at least partially surface solids on the surface of the drum walls due to the suction by means of openings in the shell is built and the adhesive solids are separated mechanically and/or pneumatically, where pi is the pressure inside the cutting drum and pa is the atmospheric pressure.

The invention device for the separation of solids from a mass flow of different properties is as compact modular unit between feeding and continuation of the sort of material placement (band pass, discharge, screen drum, eject, easily, eject, ballistic separators, etc.). It is beneficial in the present invention that the breakthroughs (A, A', A") can take the freely selectable forms in the outside surface of the drum.

A further advantage is that the shapes of the breakthroughs round-shaped, oval-shaped, star-shaped, cross-shaped, oblong, square, rectangular, triangular or exhibit a mixture of all these forms.

A further advantage is that the cross section is preferably round, plump, polygon-shaped transverse to the longitudinal axis of the drum. It is also advantageous that the drum is, where the storage ring is arranged relating to the periphery of the circumference of the drum. It is also beneficial that the allocation of the Interior of the drum is made by at least a partition wall.

A further advantage is that seals have at least a partition on the peripheral areas to the drum shell, which separate the two pressure ranges (pressure, vacuum). It is also advantageous that at least a face of the drum is closed and at least has an exhaust or supply air opening at least a face. It is also advantageous that the at least a partition of at least a tie rod, which spans the entire length of the drum inside the separating drum, is attached.

A further advantage is that at least a face of the drum is fixed and does not rotate with the faces on the perimeter have bearings that swivel storing the drum shell. Beneficial, it is also at least two waste-disposal facilities are arranged below the drum, which takes the separated material.

It is also beneficial for the process that the rotation speed of the drum shell is variably selected, which causes a further sorting of the flow of materials. Beneficial, it is also a ring gear to drive the drum is arranged on the mantle of the drum at a suitable place. It is also advantageous that the spigot with the exhaust duct of the fan is connected and is connected to the supply air connection with the discharge of the fan. It is still beneficial that the pressures in the sub-sections (D, E) variable adjustable parameters. It is beneficial that the partitions within the drums exhibit at least one thread element to their pages closest to the front with at least one end of the drum in connection.

Another advantage is it considered that a window is located on at least one end of the drum. It is also advantageous that the two surfaces (drums) are arranged and is a key element behind the parting surfaces.

Furthermore, it is advantageous to arrange at least a long sheet of any material, such as steel or plastic, displaceable perpendicular to the wall, to vary the partial volumes within the drums.

A further advantage is that the distance between the shell and the conveyor variable is adjustable.

Figure 2:
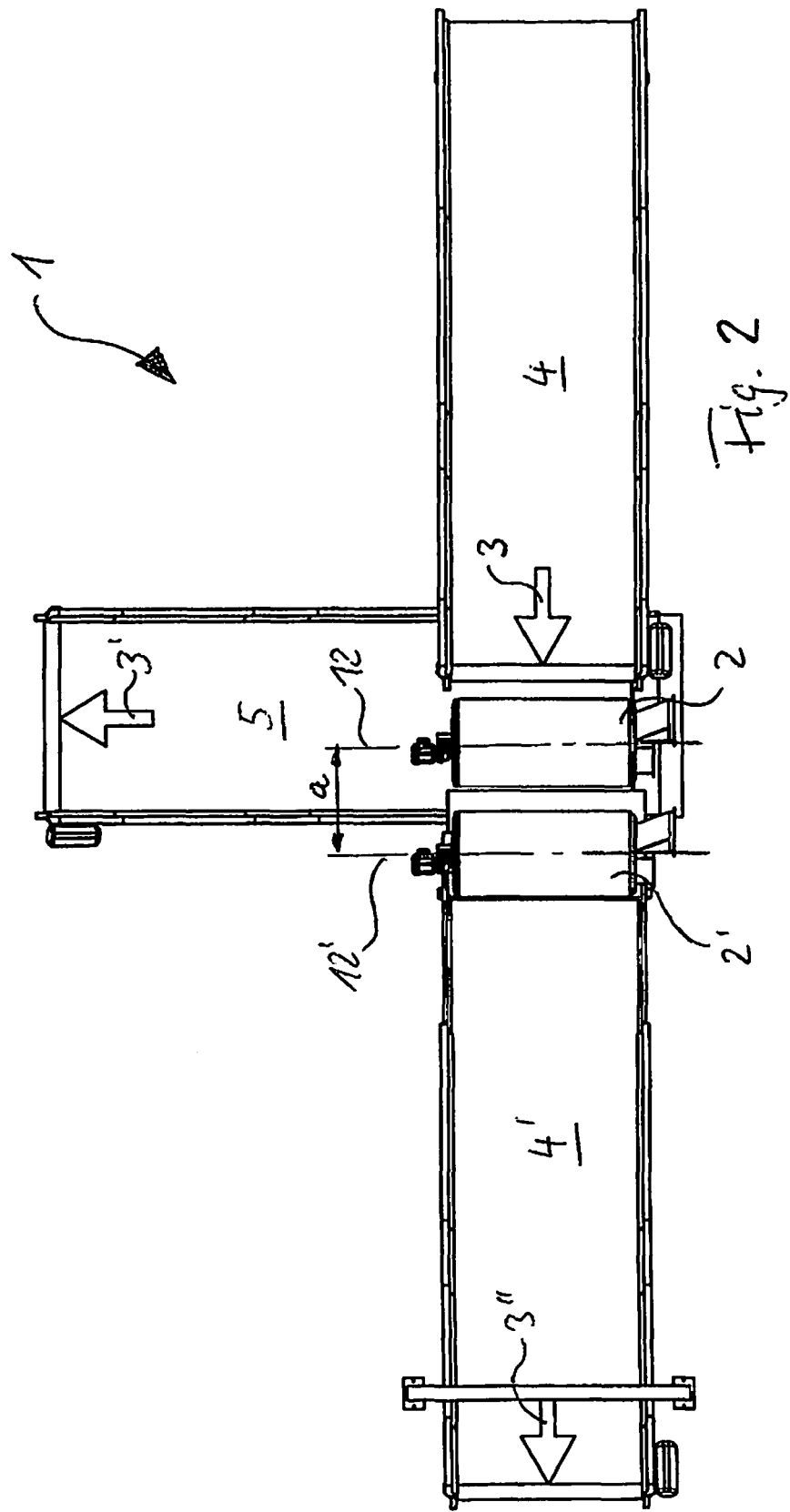
Figure 3:
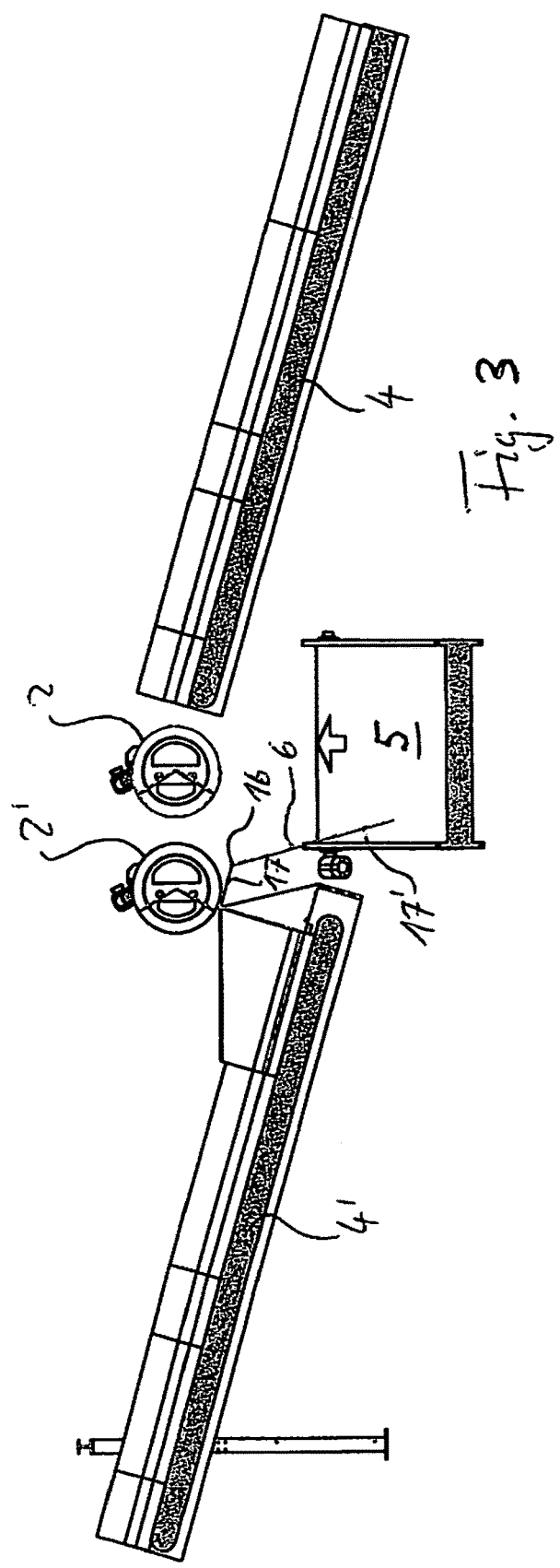
Figure 4:
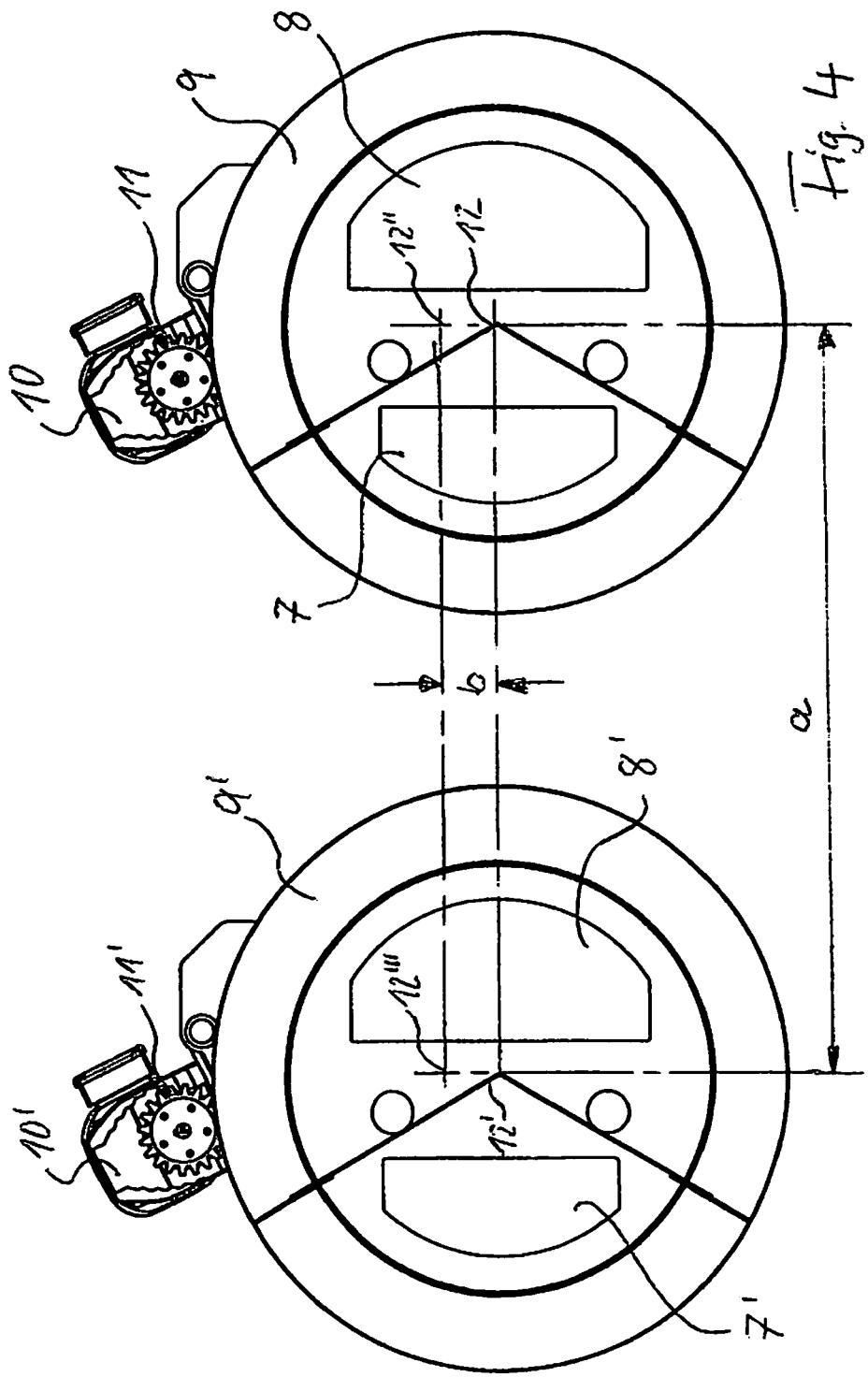
Figure 6:
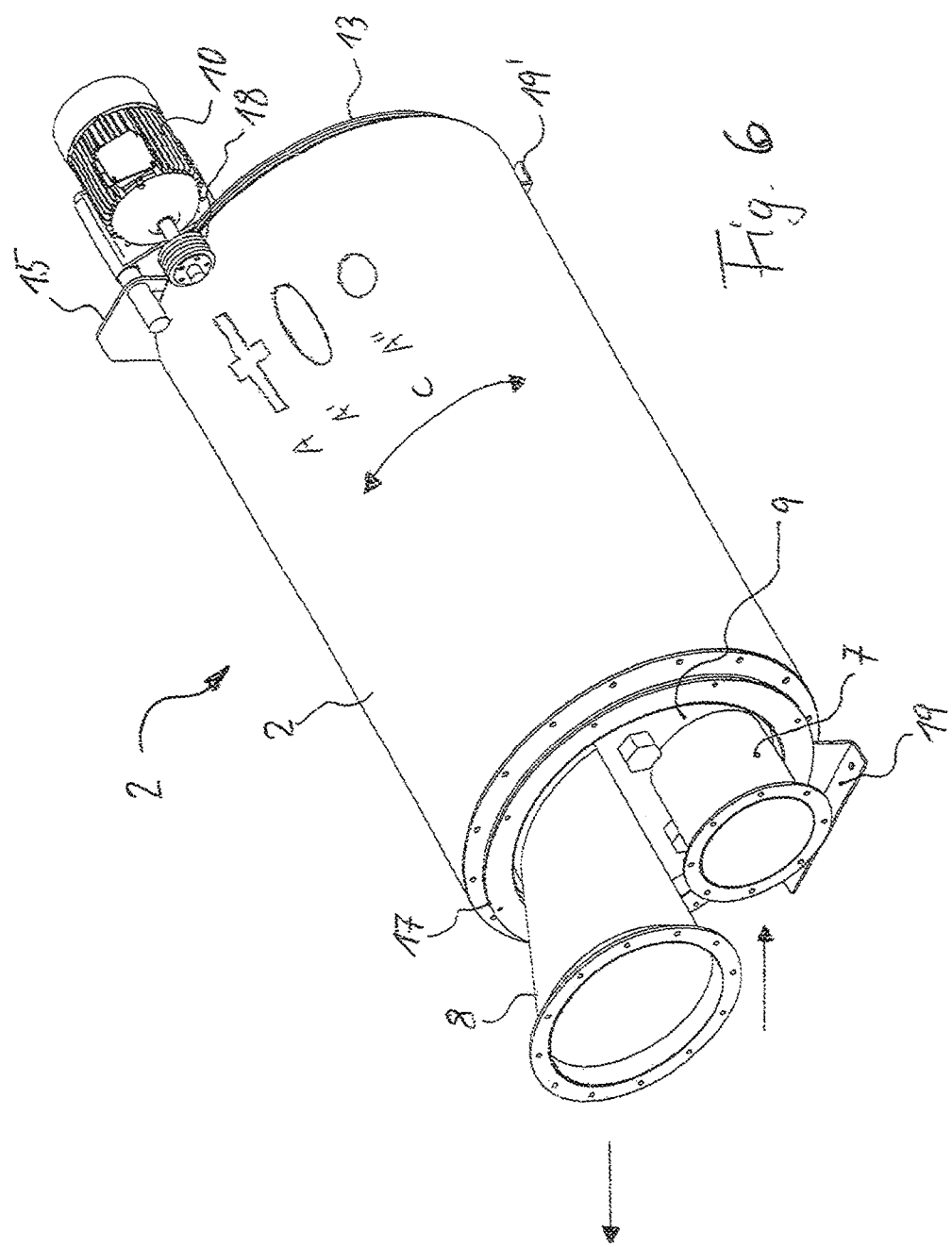
Figure 7:
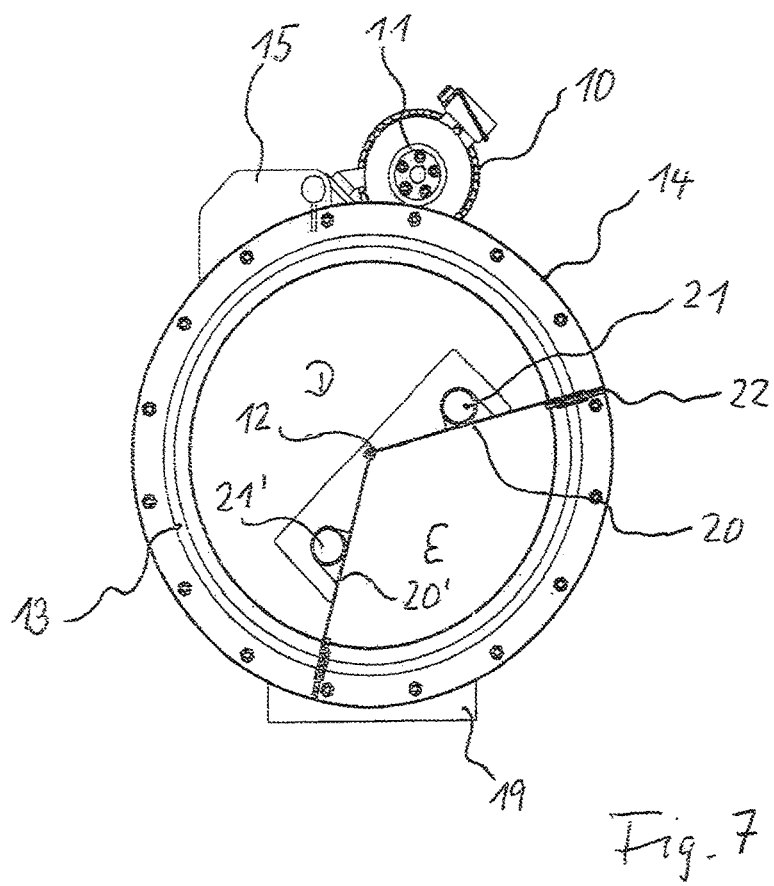
Figure 8:
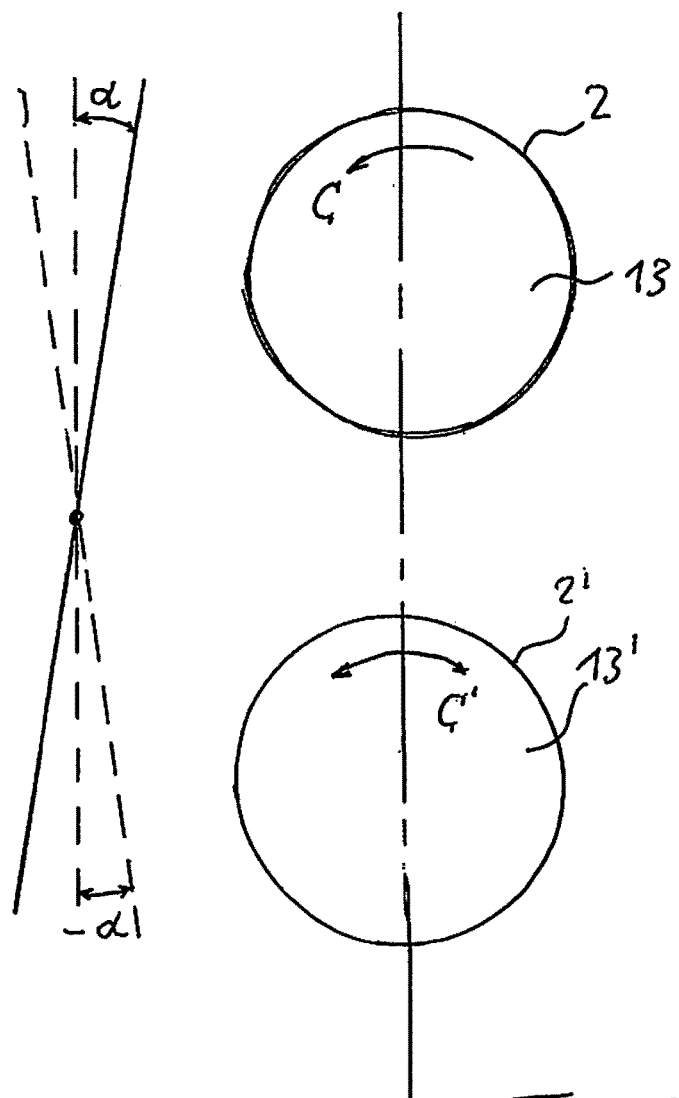
Figure 9:
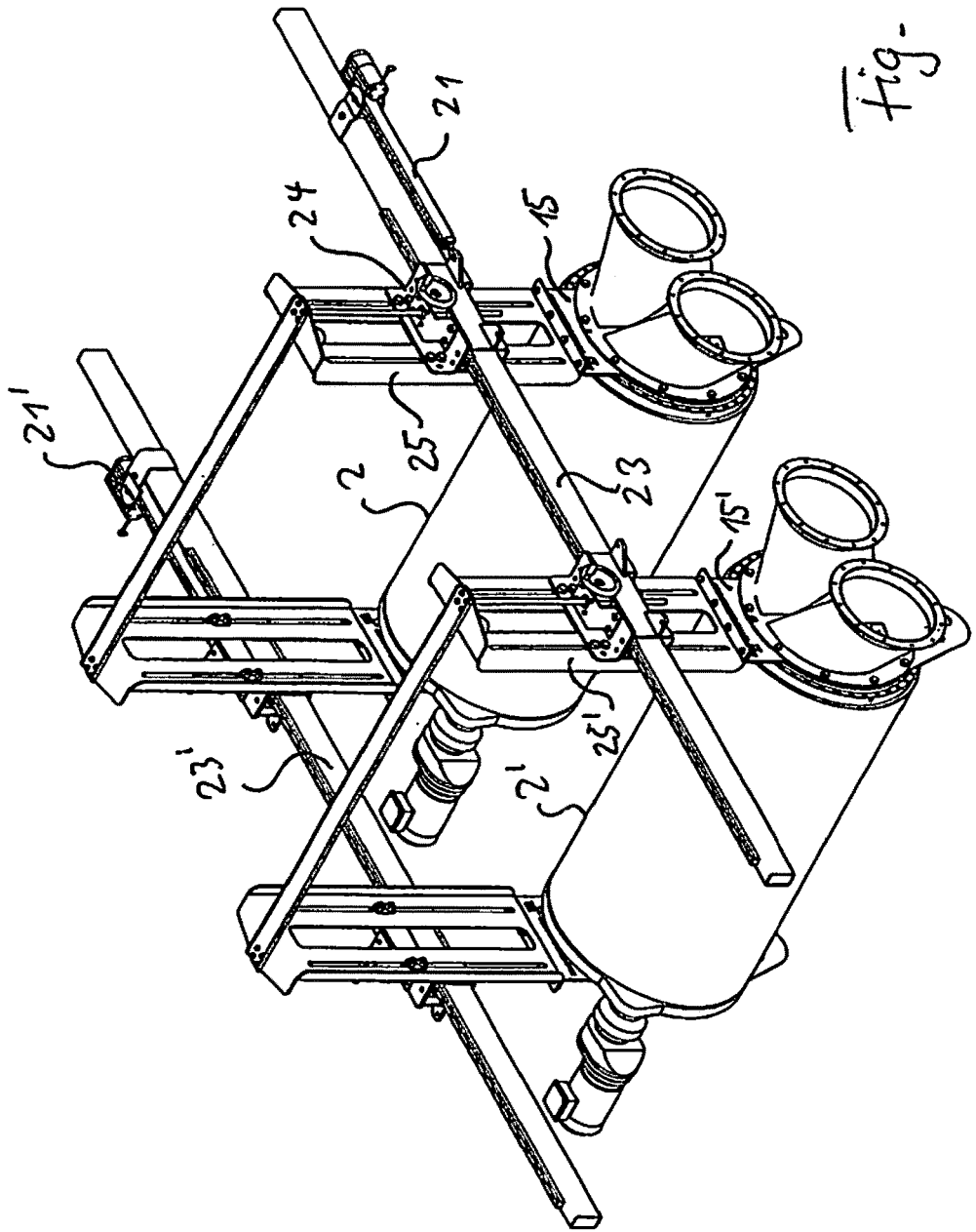
Figure 10:
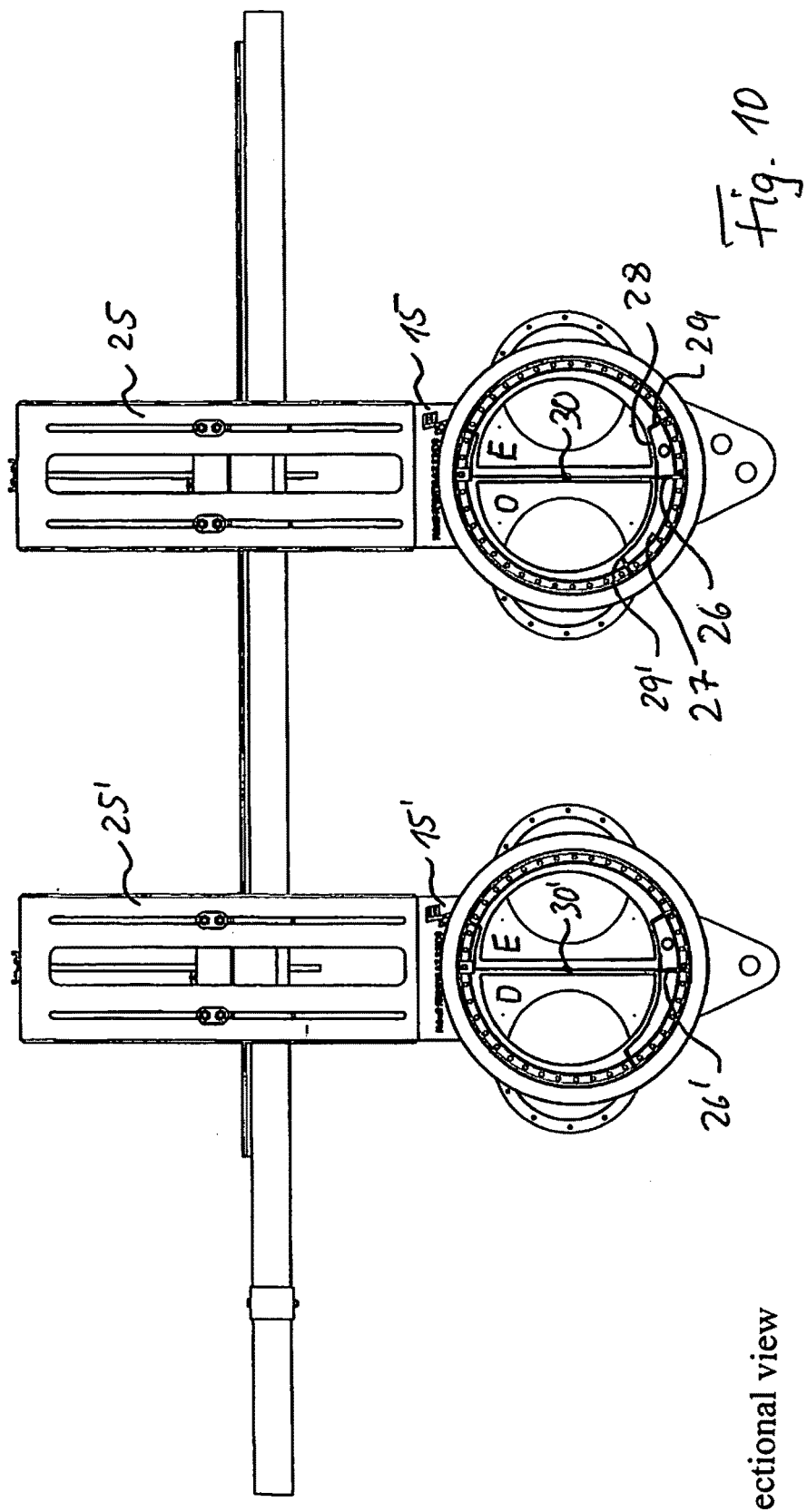
Figure 11:
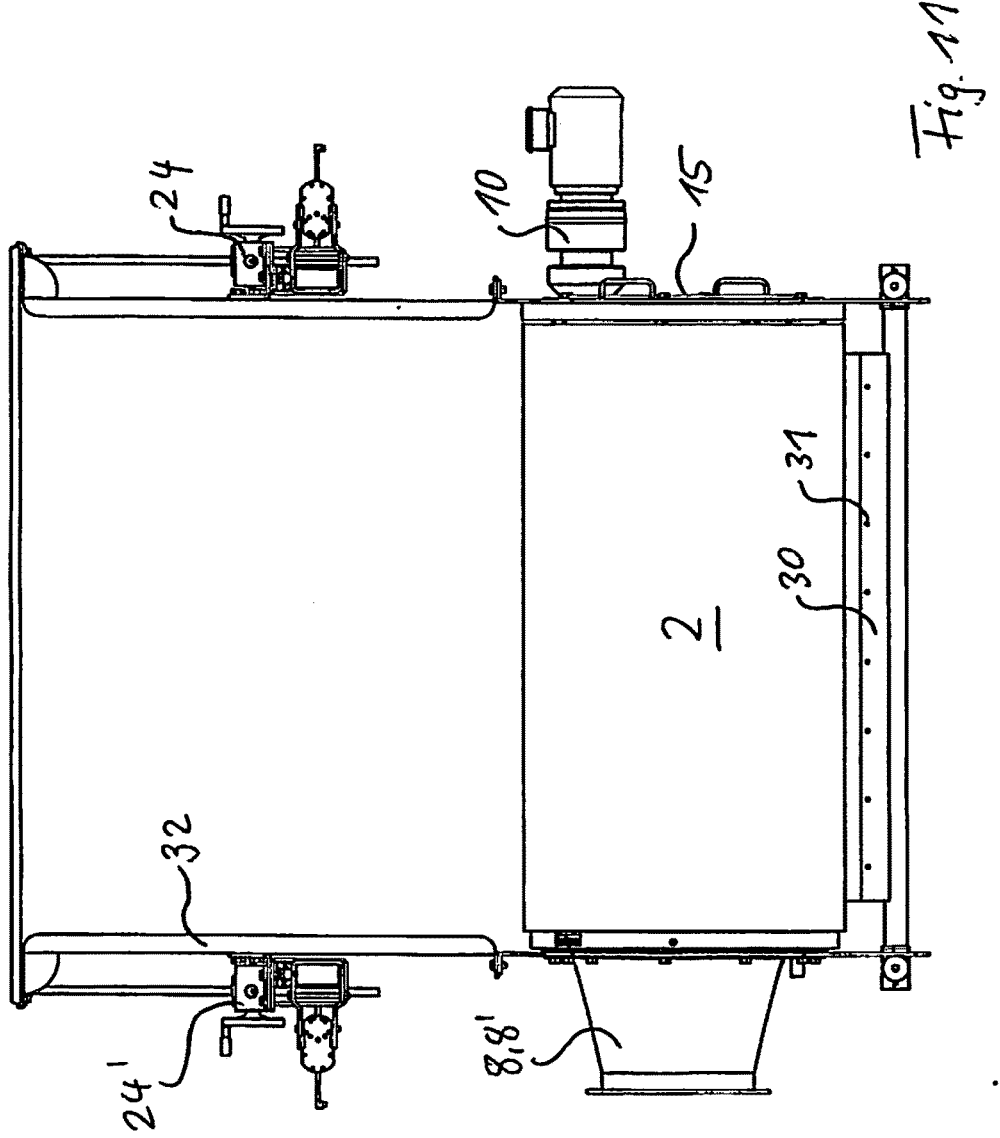

Other advantageous features are available in the claims and the description. The invention on the basis of drawings in detail is explained in the following. It shows FIG. 1: a schematic perspective representation of the device (1) with three conveyor belts (4, 4', 5) and two arranged parting surfaces (2, 2'), the drums are trained;

FIG. 2: a schematic top view of the device (1);

FIG. 3: a schematic side view of the device (1);

FIG. 4: a schematic top view of a front (9) of the two in a row connected surfaces (2, 2') with an air supply and exhaust air connection (7, 8);

FIG. 5: a schematic top view on the front (13) with the Powerplants (10, 10') of the parting surfaces (2, 2');

FIG. 6: a schematic perspective representation of a drum (2);

FIG. 7: a cutting diagram transverse to the longitudinal axis (12) of the drum (2);

FIG. 8: a schematic side view of two surfaces (2, 2') that are arranged and is arranged at the side of at least one deflection element ( . . . );

FIG. 9: an isometric perspective representation of two surfaces (2, 2'), which are attached to a shift construction;

FIG. 10: a side view on two surfaces (2, 2'), which are attached to two flanges with a shift construction;

FIG. 11: shows a schematic side release button (2) on a drum that is attached to the shifting construction (32).

The FIG. 1 shows a perspective diagram of the device 1 with three conveyor belts 4, 4', 5, and two in a row arranged parting surfaces 2, 2', as drums are trained. The parting surfaces as drums 2, 2' between the two conveyor belts, 4, 4' arranged. Right angles to the centerline of the conveyor belts of 4, 4' is below the parting surfaces 2, 2' an another conveyor belt arranged 5, which takes up a separate subset of the solids from the bulk of 3 and it brings them to a deposit not shown here. The entire bulk of 3 is first fed to the first parting surface 2, undertaking a first separation of the bulk of 3 with 2 screened the larger and heavier solids of the mass on the one hand by the gravity, on the other hand as a result of the action of the first drum. This subset of heavier falls on the conveyor belt 5. The lighter subset of bulk material 3 is from the 2nd division level 2' captured and once again subjected to the sort operation. Below the second parting surface 2' a baffle plate 6 is arranged, the down other components included of the bulk of 3' 5 draws on the conveyor belt. After the first separation process at the first division level 2 the degree of separation of the bulk material 3 is often not complete so that a further separation must be downstream to increase the degree of separation, meaning that the subsets blown as a result of the overpressure in the first drum 2 the second parting surface 2' reach and there after will be sorted. This second disconnect is with the second parting surface 2' effected by this takes the relatively large subsets of that are left, and treated in the same manner as in the first cutting operation so that the heavier subsets does not even second from the drum 2' will be accepted and immediately above the slide 6 on the conveyor belt. Drum 2' will be accepted and immediately fall over the slide 6 on the conveyor belt 5. The second parting surface 2' thus essentially once again separates the large subsets of the lighter from the remaining heavier subsets that are fed to the conveyor belt of 5. As a result, a satisfactory degree of separation is achieved by the two or more time in a row behind each other separation operations, which complies with the requirements of the waste management. The conveyor belt 4' can be performed also by an other funding body, e.g. by means of an air flow.

The FIG. 2 shows a schematic top view of the device 1 herein is evident, that the axis 8, 8' of the two cutting drums 2, 2' spaced with a predetermined distance (a) in the horizontal direction are. This distance is variable and mainly depends on the art of separating bulk material 3.

The FIG. 3 shows a schematic side view of the device 1. The arrangement of the deflector plate 6 or slide is clearly visible in this image. The baffle plate has 6 just below the cutting drum 2' an edge of 16 on the baffle plate into two sections 17, 17' divided, where the section 17 tightly below the surface of the cutting drum 2' is arranged in a predefined angle to the surface. The lower section 17' the separated material onto the conveyor 5 leads.

The FIG. 4 shows a schematic representation of the front faces 9, 9' of the two cutting drums 2, 2' where the supply air openings 7, 7' or the exhaust openings 8, 8' are arranged. In the present example, the supply air opening is 7, 7' are smaller in diameter than the exhaust opening 8 on the front face 9, 9'. The surface of the front face 9, 9' must be so chosen that the inlet and exhaust air services are guaranteed for the individual areas within the cutting drum 1. The supply air opening 7, 7' is less likely to be chosen in the present example than the exhaust openings 8,8', because the pressurized volume is generally interpreted to be greater than the overpressure volume. The front face 9, 9' is fixed with a mounting bracket not shown here, so that the cutting drum 2, 2' can be mounted in any position. The drive unit 10 puts the cutting drum 2, 2' by means of a gear 11, 11', in the engagement with a closed ring gear 14, 14' stands, in rotation. In the horizontal direction, the distance between (a)

the center lines can 12, 12' variable will be set. The same applies to the vertical spacing (b) the axis 12", 12'", what ultimately is a function of the type of bulk material.

The FIG. 5 shows a schematic representation of the side faces 13, 13' of the two cutting drums 2, 2' where the drive units 10, 10', and each a related closed sprocket 14, 14', is firmly connected with the drum. The drive 10, 10' has a motor attached on a console 15, 15'.

The FIG. 6 shows an example of two cutting drums 2, 2' with view on the connecting piece for 8 exhaust air and air inlet 7. The cutting drum is a drum shell and two side faces 9, 2 13 formed the mantle of the cutting drum 2 different in the form of breakthroughs A, A', A" has. The shell is in the area of the faces of 9, 13 by two bearings 17, 17', which can be circular trained. The cutting drum 2 accordingly sits on two bearings, which are designed in diameter, that on the front 9, 13 of the drum shell exists enough surface to deduce the exhaust or supply air via fixed supply and exhaust air connection 7 to 8 in the drum or the drum. Supply and exhaust air connection are where it is connected to the air Socket 7 with the discharge of the fan and the exhaust air connection with the vacuum line of the fan connected to the fan not shown here. Through the non-rotating front 9, 9' areas in the cylinder 2 to a low pressure area D (pi <pa) and a gauge or atmospheric pressure E (pi ≥pa) be divided. With the nozzle 8, air from the low-pressure area is sucked D and through the Socket 7, air is injected into the drum 2 of the pressure area E. The cutting drum 2 is using two mounting brackets 18, 18' at the end of a not shown here conveyor belt fixed or adjustable mounted. In addition, the drum 2 with the help of a drive of 10 on a drive roller of 18 in rotation moves. Drive 10 15 on the non-rotating front 13 is attached via a console. The drive roller 18 is this running example on the outer side of the drum mantle of driven cutting drum 2 so she can be put into rotation in two directions C. The complete unit is with the brackets 19, 19' placed on site. Depending on the application and intended use, the drum can be powered also by other, not shown here drive means, e.g. belt chain tooth shoots.

The FIG. 7 shows a sectional view across to the drum axis 12. The volume of the drum is divided into the present embodiment into two sections D, E, where the part D is the vacuum, in which the internal pressure pi is smaller than the outside air pressure pa and in its other part E the pressure pi is greater than or equal to the atmospheric pressure pa. In this design example the partition consists of two part partitions 20, 20', to tie rods 21, 21' are attached. The tie rods 21, 21' spread over the entire length of the cutting drum 1 and are on the faces of 9, 9' the drum mounted 2. Dividers 20, 20' are at their ends in the area of the inner wall of the drum seals 22, 22', which separate the negative or the positive pressure area inside the drum. The 17 bearings have the geometric conditions adapted diameter.

The FIG. 8 shows a perspective side view on the faces of 13, 13' two parting surfaces, as drums 2, 2' are trained. This arrangement of the parting surfaces, the horizontal shift (a) is practically zero and the vertical displacement (b) adopts a predetermined size, which to choose is depending on the type of bulk material 3. The bulk of the material covered in this presentation on the upper drum 2, is pre-sorted according to the cutting process described above so that certain heavier parts fly away after a short time of contact with the cutting area 2 of this and learn a different direction by a guiding element 14. The angle +/−α is dependent on the bulk and according to the bulk of 3 to adjust. The direction of rotation C' is also to adapt the specific circumstances of the bulk material.

The FIG. 9 shows a perspective view of two side by side arranged drums 2, 2', with two flanges 15, 15' can be detachably attached to a shift construction are. The two drums allows the shift construction 2, 2' both horizontal (a) and vertical (b) direction by means of a mechanism to describe unspecified will be moved. The setting of the positions of the drums to each other is required to achieve a higher degree of separation, because heavier parts fall down faster than lighter parts. With hydraulic or pneumatic actuators, the shift construction is 21, 21', the horizontal shift of a the drums along the guide rails of 23, 23' cause. In the present example are for the vertical displacement of b electric actuators 24, 24', the drums along the guide rails 25, 25' move.

The FIG. 10 shows a schematic side view on the sides of the drums of 2, 2', the flanges 15, 15' on the part of the vertical displacement of 25, 25' are attached. The internal volume of each drum 2, 2' is by a vertical partition wall 20, 20' divided into two volumes of part D and E. In the area of 26, ends 26' partition walls 20, 20' 27, are approximately right angles to the surface of the walls arranged 28 exhibit a seal Assembly 29 at the end of which the vacuum and hyperbaric chambers are sealed. The seals 29, 29' touching the inside walls 30 of drums 2, 2' cause a perfect seal to the atmospheric outdoor space. The plates 27, 28 can be moved either to order the partial volumes of D, E to vary.

The FIG. 11 shows a schematic side release button (2) on a drum that is attached to the shifting construction. On the left side of the connector is 8, 8' arranged for the air intake or air outlet. On the right side in this representation, the drive unit 10 is fixed to the flange of the front 13 15. Also the flange 15 is solvable connected with the shift construction, the parting surface 2 in horizontal and vertical direction using two actuators 24, 24' offset. In this embodiment of the invention a pneumatic device 30 is arranged at the bottom of the drum 2, if necessary on the surface or in the cracks of A, A', A" remaining parts hang through a targeted air flow through nozzles supersedes 31 or flow vents. In another execution example, the parting surface 2 will be mechanically replaced by plunger, which intervene in the openings of the parting surface. The mechanical/pneumatic cleaning Unit 30, 30' can be arranged both outside and inside the drum.

The invention has relatively many set-up and execution capabilities to the Improvement and adaptation of the separation degree of solids. The change of speed and suction and blowing effect in the drum can be discontinued at any time without significant effort or modified. The diameter and the position of the drum as well as the opening and hole size significantly change the outcome of separation and is adapted to the each led to solid mass flows in type and quantity.

The invention claimed is:

1. A device (1), suitable for cutting flat and body-shaped solids, or for cutting light, medium and heavy solids in bulk goods (3), comprising a first parting surface (2);

a second parting surface (2'), wherein the second parting surface (2') is disposed relative to the first parting surface (2) at a pre-determined horizontal (a) and vertical distance (b) and wherein the first parting surface (2) and the second parting surface (2') are formed as drums wherein the body shaped components of bulk solids touch successively the first parting surface (2) and the second parting surface (2), wherein a first swiveling drum parting surface (2) is closed on a first front face (9), wherein a second swiveling drum parting surface (2') is closed on a second front face (9');
a first exhaust opening (8) or a first supply air opening (7) arranged at the first front face (9);
a second exhaust opening (8') or a second supply air opening (7') arranged at the second front face (9'), wherein
a first allocation of a first interior of the first drum parting surface (2) is formed by a first drum wall (20) and wherein
a second allocation of a second interior of the second drum parting surface (2') is formed by a second drum wall (20'), wherein
the first parting surface (2) and
the second parting surface (2') are formed as drums and are connected at the ends of the drums with a location shifting construction (21-25), wherein the location shifting construction moves the drums (2, 2') in a horizontal (a) and a vertical (b) direction.

2. The device according to claim 1, wherein a cross section perpendicular to the longitudinal axis of the drum (2, 2') is roundish, polygon-shaped, or round.

3. The device according to claim 1, further comprising
a first support (17) of the first drum (2) arranged ring-shaped in a first area of a periphery of a circumference of the first drum (2) and a second support (17') of the second drum (2') arranged ring-shaped in a second area of a periphery of a circumference of the second drum (2).

4. The device according to claim 1,
wherein
the first drum wall (20)
has a first seal (22) in a first peripheral area of a first shell of the first drum (2) and wherein
the second drum wall (20')
has a second seal (22') in a second peripheral area of a second shell of the second drum (2').

5. The device according to claim 1, further comprising
a first draw bar (21), wherein
the first drum wall (20) is attached to
the first draw bar (21), wherein
the first draw bar (21) extends over the entire length of the first drum (2), and
a second draw bar (21'), wherein
the second drum wall (20) is attached
to the second draw bar (21'), wherein
the second draw bar (21') extends over the entire length of the second drum (2').

6. The device according to claim 1, wherein the front face (9, 13) of the drum (2) is fixed and not rotating, wherein the front face (9, 13) exhibits bearings (17, 17') on a circumference, wherein the bearings (17, 17') rotatably support a shell of the drum (2,2').

7. The device according to claim 1, wherein a drum (2) has a gear rim on a shell at the front face (9, 13),
wherein
the gear rim causes a rotation of the drum.

8. The device according to claim 1, wherein an exhaust air connection (8) is connected with an exhaust duct of a fan and wherein
a supply air outlet (7) is connected with a pressure line of the fan.

9. The device according to claim 1, wherein the first drum parting surface (2) and the second swiveling drum parting surface (2') are disposed on top of each other, and
a guide element (14) is disposed behind the parting surfaces (2, 2').

10. The device according to claim 1, further comprising a first long extended sheet metal (27, 28), which is displaceable transverse to the first drum wall (20) and the second drum wall (20').

11. The device according to claim 1, further comprising
a mechanical or pneumatic device (30) is disposed
in an area of parting surfaces (2, 2') for cleaning breakthrough openings (A, A' A")
in the parting surfaces (2,2').

12. A procedure comprising forming a first parting surface as a rotating drum (2) with variable rotation speed; cutting flat and body-shaped solids of a bulk material with a device (1) with the first parting surface (2);
closing a front face (9, 9') of the rotating drum;
placing an exhaust or supply air opening (7, 8) at the front face;
forming a subdivision of the interior chamber of the drum (2, 2') by drum walls (20,20');
feeding solids to the first parting surface (2);
following the first parting surface (2)
with a second parting surface (2');
arranging horizontal and vertical distances (a, b) of the first parting surface (2) and
the second parting surface (2') at a predetermined variable distance from each other;
feeding the bulk material in a time sequence to be separated.

13. The procedure according to claim 12, wherein the first parting surface (2)
and the second parting surface (2') are vibrant planes.

14. The procedure according to claim 12, further comprising
selecting distances (F) between a shell and a conveyor (4) to be variable depending on the type of bulk material.

15. The procedure according to claim 12, further comprising
varying the effective volumes (D, B) in an interior of the drums (2, 2').

16. A device (1), suitable for cutting flat and body-shaped solids, or for cutting light, medium and heavy solids in bulk goods (3), comprising a first parting surface (2); a second parting surface ($2^1$), wherein the second parting surface (2') is disposed relative
to the first parting surface (2) at a pre-determined horizontal (a) and vertical distance (b) wherein the first parting surface (2) and the second parting surface (2') are formed as drums such that the body shaped components of bulk solids touch successively the first parting surface (2) and the second parting surface (2'), wherein
a first swiveling drum parting surface (2) is closed on a first front face (9), wherein
a second swiveling drum parting surface (2') is closed on a second front face (9');
a first exhaust opening (8) or
a first supply air opening (7) arranged at the first front face (9);
a second exhaust opening (8') or
a second supply air opening (7') arranged at the second front face (9');
a first drum wall (20) formed by a first allocation of a first interior of the first drum parting surface (2);
a second drum wall (20') formed by a second allocation of a second interior of the second drum parting surface (2').

17. The device according to claim 16 further comprising a first rotary support (17) of the first drum (2), wherein
the first rotary support is disposed in a first region of a periphery of a circumference of the first drum (2);
a second rotary support (17') of the second drum (2'), wherein
the second rotary support is disposed in a second region of a periphery of a circumference of the second drum (2').

* * * * *